United States Patent
Arpin et al.

(10) Patent No.: US 9,819,029 B2
(45) Date of Patent: Nov. 14, 2017

(54) METHOD OF MAKING A FUEL CELL COMPONENT

(71) Applicant: DOOSAN FUEL CELL AMERICA, INC., Atlanta, GA (US)

(72) Inventors: Kevin Arpin, Coventry, CT (US); Nicole Hofstetter, Coventry, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 0 days.

(21) Appl. No.: 15/043,726

(22) Filed: Feb. 15, 2016

(65) Prior Publication Data

US 2017/0237077 A1    Aug. 17, 2017

(51) Int. Cl.
*H01M 4/88* (2006.01)
*H01M 4/86* (2006.01)
*H01M 4/90* (2006.01)

(52) U.S. Cl.
CPC ....... *H01M 4/8807* (2013.01); *H01M 4/8605* (2013.01); *H01M 4/8657* (2013.01); *H01M 4/8668* (2013.01); *H01M 4/8828* (2013.01); *H01M 4/8835* (2013.01); *H01M 4/8878* (2013.01); *H01M 4/8882* (2013.01); *H01M 4/9041* (2013.01)

(58) Field of Classification Search
CPC ............. H01M 4/8807; H01M 4/8605; H01M 4/8657; H01M 4/8668; H01M 4/8828; H01M 4/8835; H01M 4/8878; H01M 4/8882; H01M 4/9041
USPC .............. 502/101; 427/115, 124, 350, 383.1; 429/400, 523–528
See application file for complete search history.

(56) References Cited

U.S. PATENT DOCUMENTS

| | | | | |
|---|---|---|---|---|
| 3,533,851 A | * | 10/1970 | Adlhart | H01M 8/0245 427/115 |
| 4,166,143 A | * | 8/1979 | Petrow | H01M 4/8663 252/182.1 |
| 4,233,181 A | | 11/1980 | Goller et al. | |
| 4,810,594 A | | 3/1989 | Bregoli et al. | |
| 4,867,857 A | * | 9/1989 | von Benda | H01M 4/8668 204/290.01 |
| 6,187,468 B1 | * | 2/2001 | Shinkai | H01M 4/8605 29/623.5 |

(Continued)

FOREIGN PATENT DOCUMENTS

| | | | | |
|---|---|---|---|---|
| CN | 10-4488119 | * | 4/2015 | ............. H01M 4/86 |
| CN | 10-5322185 | * | 2/2016 | ............. H01M 4/88 |
| CN | 105322185 | | 2/2016 | |

OTHER PUBLICATIONS

The International Search Report and Written Opinion for PCT Application No. PCT/US2017/017771, dated May 22, 2017.

*Primary Examiner* — Patricia L. Hailey
(74) *Attorney, Agent, or Firm* — Carlson, Gaskey & Olds

(57) ABSTRACT

An illustrative example method of making a fuel cell component includes mixing a catalyst material with a hydrophobic binder in a solvent to establish a liquid mixture having at least some coagulation of the catalyst material and the hydrophobic binder. The liquid mixture is applied to at least one side of a porous gas diffusion layer. At least some of the solvent of the applied liquid mixture is removed from the porous gas diffusion layer. The catalyst material remaining on the porous gas diffusion layer is dried under pressure.

20 Claims, 2 Drawing Sheets

(56) References Cited

U.S. PATENT DOCUMENTS

| | | | | |
|---|---|---|---|---|
| 6,844,286 B2* | 1/2005 | Kohler | ................ | B01J 37/0219 |
| | | | | 429/483 |
| 7,091,149 B2* | 8/2006 | Iwasaki | ............... | H01M 4/8605 |
| | | | | 156/247 |
| 7,153,802 B2* | 12/2006 | Manco | ................ | H01M 4/8668 |
| | | | | 427/115 |
| 8,168,025 B2* | 5/2012 | Mah | ..................... | B32B 37/025 |
| | | | | 156/230 |
| 8,367,266 B2* | 2/2013 | Harkness | ............... | B82Y 30/00 |
| | | | | 420/461 |
| 2002/0134501 A1* | 9/2002 | Fan | ..................... | H01M 4/8807 |
| | | | | 156/308.2 |
| 2004/0023105 A1* | 2/2004 | Hohenthanner | ..... | B01J 37/0215 |
| | | | | 429/480 |
| 2006/0260955 A1 | 11/2006 | Sasaki et al. | | |
| 2007/0154778 A1 | 7/2007 | Haufe et al. | | |
| 2009/0068542 A1* | 3/2009 | Kiyoto | ....................... | C08J 3/02 |
| | | | | 429/483 |
| 2010/0291467 A1 | 11/2010 | Ji et al. | | |
| 2011/0143254 A1* | 6/2011 | Kongkanand | ......... | H01M 4/861 |
| | | | | 429/483 |
| 2016/0197369 A1 | 7/2016 | Lee et al. | | |

\* cited by examiner

METHOD OF MAKING A FUEL CELL COMPONENT

TECHNICAL FIELD

The subject matter of this disclosure generally relates to making fuel cell components. More particularly, though without limitation, this disclosure pertains to making fuel cell electrodes using a liquid solution for depositing a catalyst layer onto a gas diffusion substrate.

DESCRIPTION OF THE RELATED ART

Fuel cells are devices that generate electricity based upon an electrochemical reaction. Fuel cells include various components that facilitate that reaction. For example, fuel cells include electrodes.

One type of electrode used in phosphoric acid fuel cells includes a catalyst layer supported on a porous gas diffusion substrate. The typical way in which such electrodes are made includes making an aqueous dispersion containing metal catalyst supported on high surface area carbon/graphite and a hydrophobic polymer binder. The mixture is flocculated and water is removed from the mixture leaving a powder. The typical approach includes drying the powder, crushing it and depositing it onto the gas diffusion substrate.

One reason why a dried powder is used instead of applying the aqueous dispersion onto the gas diffusion substrate is that it is well-recognized that it is difficult to avoid cracking when drying an aqueous dispersion. Such cracking would be undesirable in a catalyst layer of a fuel cell electrode. Suggested techniques for minimizing such cracking include increasing the solids content of the mixture, decreasing a drying rate or adding polymeric binders to the mixture. Increasing the solids content is not an attractive solution for making a fuel cell electrode because the electrode materials are generally hydrophobic and difficult to disperse in water. Decreasing the drying rate is not practical for manufacturing a fuel cell electrode because the reduced throughput during the manufacturing process increases costs and decreasing cost is a primary concern of fuel cell manufacturers. Introducing additional binders is not desirable because that could negatively affect the electrochemical performance of a fuel cell. Additionally, the binders may introduce a risk of contaminating the cell.

SUMMARY

An illustrative example method of making a fuel cell component includes mixing a catalyst material with a hydrophobic binder in a solvent to establish a liquid mixture having at least some coagulation of the catalyst material and the hydrophobic binder. The liquid mixture is applied to at least one side of a porous gas diffusion layer. At least some of the solvent of the applied liquid mixture is removed from the porous gas diffusion layer. The catalyst material remaining on the porous gas diffusion layer is dried under pressure.

Various features and advantages of at least one disclosed example embodiment will become apparent to those skilled in the art from the following detailed description. The drawings that accompany the detailed description can be briefly described as follows.

DETAILED DESCRIPTION

Figure 1:
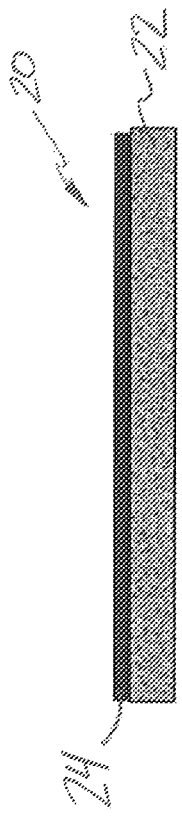
FIG. 1 diagrammatically illustrates an example fuel cell component designed according to an embodiment of this invention.

FIG. 1 illustrates a fuel cell component 20. In this example, the component 20 is an electrode that is useful for a phosphoric acid fuel cell. The example component 20 has a porous gas diffusion layer substrate 22 and a catalyst layer coating 24 on at least one side of the substrate 22. The catalyst layer in some examples is between approximately 50 and 200 microns thick and is essentially continuous across the substrate 22. In one example, the substrate 22 comprises carbon fiber paper and in another example comprises graphite fibers. For discussion purposes, a carbon paper substrate 22 is mentioned below. The catalyst layer 24 comprises a metal catalyst or another material such as graphene. For discussion purposes a metal catalyst is mentioned below. Given this description, those skilled in the art will be able to select appropriate materials to realize the fuel cell component that will meet their particular needs.

Figure 2:
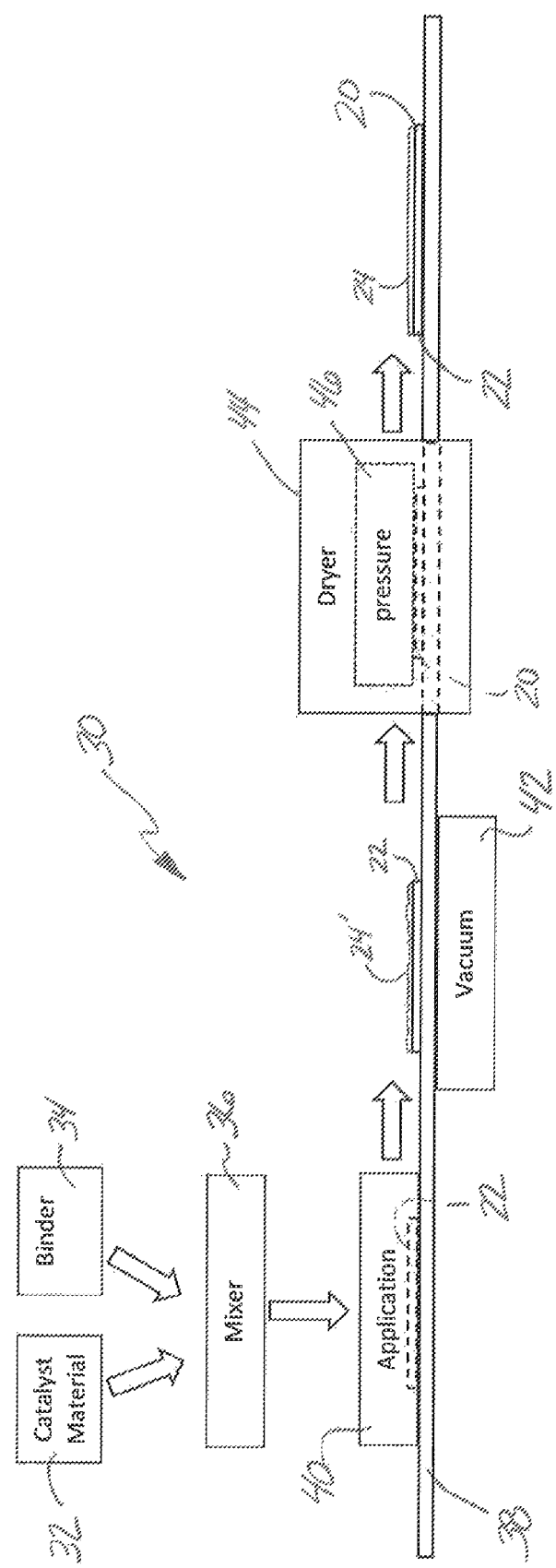
FIG. 2 schematically illustrates an arrangement for making a fuel cell component designed according to an embodiment of this invention.

FIG. 2 illustrates an arrangement 30 for making the example fuel cell component 20. Catalyst material schematically represented at 32 is combined with a binder schematically represented at 34 within a mixer 36. The catalyst material 32 may be any metal catalyst that is useful as a catalyst within phosphoric acid fuel cells, for example. The binder 34 is a hydrophobic binder that is stable in phosphoric acid at 200 deg C., such as polytetrafluoroethylene.

The mixer 36 is configured to mix the catalyst material 32, the binder 34 and a solvent, such as water, in a manner that results in at least some coagulation of the catalyst material 32 and the binder 34. Some examples include flocculating the mixture to provide a desired amount of coagulation.

A porous gas diffusion layer substrate material 22 is supported on a surface 38, which may be a table or belt configured to facilitate an automated process of making the component 20. An application station 40 applies the liquid mixture having at least some coagulation of the catalyst material 32 and the hydrophobic binder 34. The application station 40 in this example is configured to directly deposit the mixture onto the porous gas diffusion layer substrate 22. In one example, the application station 40 performs a deposition process including at least one of curtain coating, doctor blading, spray coating, slot die coating, transfer printing or screen printing the liquid mixture onto the porous gas diffusion layer substrate.

As schematically represented at 42, a vacuum is used for drawing at least some of the solvent (e.g., water) of the applied liquid mixture 24 through the porous gas diffusion layer substrate 22 to remove that solvent from the coating layer on the substrate. Other techniques for removing at least some of the solvent of the mixture are used in some embodiments including heating. The coagulation of the catalyst material 32 and binder 34 allows for the catalyst material of the mixture to remain on the gas diffusion layer substrate 22. Those skilled in the art who have the benefit of this description will be able to select an appropriate vacuum pressure to achieve sufficient removal of the water from the liquid mixture while leaving catalyst material on the substrate 22. In the illustrated example, although water is removed from the mixture, the catalyst layer is not allowed to completely dry except under controlled conditions.

A dryer station 44 dries the catalyst material remaining on the porous gas diffusion layer substrate in a controller manner. A pressure applying device 46 is included in the dryer station 44 so that drying the catalyst material occurs under pressure. The pressure device 46 applies an axial load to the catalyst layer 24 and the gas diffusion layer substrate 22 to prevent cracking of the resulting catalyst layer coating 24 during drying.

In one example, the pressure applying device 46 comprises a heated roll press, which allows for a continuous drying process. Another example includes a heated double belt press as the pressure device 46, which also allows for a continuous manufacturing process. Other pressure applying devices may be used. The pressure applied in the illustrated example is approximately 200 psi (14 bar).

In the illustrated example, the drying occurs at a temperature of approximately 240° F. (115° C.).

Making a fuel cell component using an arrangement as schematically shown in FIG. 2 eliminates the drying and crushing steps associated with a conventional process for establishing a powder that is then deposited onto a gas diffusion substrate. By eliminating those steps, the illustrated example enhances economies associated with making fuel cell components. Additionally, the illustrated arrangement allows for a continuous deposition process, which further enhances economies associated with making fuel cell components, such as electrodes for use in phosphoric acid fuel cells.

Figure 3:
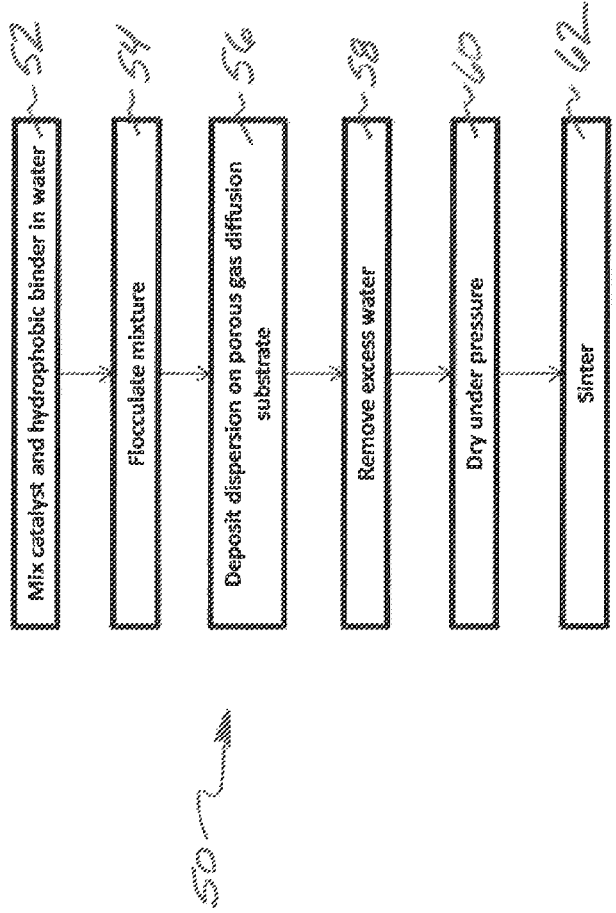
FIG. 3 is a flowchart diagram summarizing an example approach for making a fuel cell component according to an embodiment of this invention.

FIG. 3 is a flowchart diagram 50 that summarizes an example approach. At 52, the catalyst and hydrophobic binder are mixed in water. At 54, the mixture is flocculated to establish a desired amount of coagulation of the catalyst material and the binder.

At 56, the liquid mixture, which is an aqueous dispersion in this example, is deposited onto the porous gas diffusion substrate 22. At 58, excess water from the deposited mixture is removed, such as by a vacuum. At 60, the remaining catalyst material on the porous gas diffusion substrate layer is dried under pressure. The example of FIG. 3 includes sintering the remaining catalyst layer at 62 after controlled drying.

While the example of FIG. 3 includes flocculating the fixture at 54, other examples include introducing a dispersant to increase the dispersion of the catalyst and binder mixture in water. Example surfactants that may be used as such a dispersant include TritonX100 and polymers such as polyvinyl alcohol.

The disclosed example techniques contribute toward reducing costs associated with fuel cells by allowing for a more continuous and cost-effective manufacturing process. They also provide a reliable way of establishing an effective catalyst layer on an electrode.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a fuel cell component, the method comprising:
    mixing a catalyst material with a hydrophobic binder in a solvent to establish a liquid mixture having at least some coagulation of the catalyst material and the hydrophobic binder;
    applying the liquid mixture to at least one side of a porous gas diffusion layer;
    removing at least some of the solvent of the applied liquid mixture from the porous gas diffusion layer using a vacuum to pull the at least some of the solvent through the porous gas diffusion layer; and
    drying the catalyst material remaining on the porous gas diffusion layer under pressure.

2. The method of claim 1, wherein the mixing includes flocculating the mixture to establish the at least some coagulation of the catalyst material and the hydrophobic binder.

3. The method of claim 1, wherein the mixing includes mixing water, the catalyst material and the hydrophobic binder.

4. The method of claim 3, wherein the catalyst material comprises a metal and the hydrophobic binder comprises polytetrafluoroethylene.

5. The method of claim 1, wherein the applying comprises coating the at least one side of the porous gas diffusion layer with the mixture.

6. The method of claim 5, wherein the applying comprises at least one of
    curtain coating the mixture onto the porous gas diffusion layer;
    spray coating the mixture onto the porous gas diffusion layer;
    doctor blading the mixture onto the porous gas diffusion layer;
    slot die coating the mixture onto the porous gas diffusion layer;
    transfer printing the mixture onto the porous gas diffusion layer; and
    screen printing the mixture onto the porous gas diffusion layer.

7. The method of claim 1, comprising
    supporting the porous gas diffusion layer on a first side of a surface; and
    establishing the vacuum from a second, opposite side of the surface.

8. The method of claim 7, wherein the established vacuum pulls the at least some of the solvent through the porous gas diffusion layer and the surface.

9. The method of claim 7, wherein the surface comprises at least one of a table and a belt.

10. The method of claim 1, wherein the drying comprises heating the catalyst material remaining on the porous gas diffusion layer using a temperature of 240° F. (115° C.).

11. The method of claim 10, wherein the pressure is 200 psi (14 bar).

12. The method of claim 1, wherein the drying comprises applying an axial load using a press to achieve the pressure.

13. The method of claim 12, the press comprises at least one of a hot press, a heated roll press, and a heated double belt press.

14. The method of claim 1, comprising sintering the catalyst material remaining on the porous gas diffusion layer after controlled drying.

15. The method of claim 1, wherein a resulting layer of catalyst material covers the at least one side of the porous gas diffusion layer.

16. The method of claim 15, wherein the resulting layer of catalyst material is generally uniform across the at least one side of the porous gas diffusion layer.

17. The method of claim 15, wherein the resulting layer of catalyst material is at least 50 microns thick.

18. A method of making a fuel cell component, the method comprising:
mixing a catalyst material with a hydrophobic binder in a solvent to establish a liquid mixture having at least some coagulation of the catalyst material and the hydrophobic binder;
applying the liquid mixture to at least one side of a porous gas diffusion layer;
removing at least some of the solvent of the applied liquid mixture from the porous gas diffusion layer by supporting the porous gas diffusion layer on a first side of a surface, establishing a vacuum from a second, opposite side of the surface and using the vacuum for the removing; and
drying the catalyst material remaining on the porous gas diffusion layer under pressure.

19. The method of claim 18, wherein the established vacuum pulls the at least some of the solvent through the porous gas diffusion layer and the surface.

20. The method of claim 18, wherein the surface comprises at least one of a table and a belt.

* * * * *